US009294412B2

(12) United States Patent  (10) Patent No.: US 9,294,412 B2
Horvath et al.  (45) Date of Patent:  Mar. 22, 2016

(54) CONTROLLER AREA NETWORK (CAN) WORST-CASE MESSAGE LATENCY WITH PRIORITY INVERSION

(71) Applicant: Mentor Graphics Corporation, Wilsonville, OR (US)

(72) Inventors: Istvan Horvath, Torslanda (SE); Zoltan Matyas, Budapest (HU)

( * ) Notice: Subject to any disclaimer, the term of this patent is extended or adjusted under 35 U.S.C. 154(b) by 274 days.

(21) Appl. No.: 14/013,941

(22) Filed: Aug. 29, 2013

(65) Prior Publication Data

US 2015/0063120 A1  Mar. 5, 2015

(51) Int. Cl.
*H04L 12/50* (2006.01)
*H04L 12/841* (2013.01)
*H04L 12/833* (2013.01)
*H04L 12/875* (2013.01)
*H04L 12/40* (2006.01)
*H04J 3/16* (2006.01)
*H04L 12/70* (2013.01)

(52) U.S. Cl.
CPC ........ *H04L 47/283* (2013.01); *H04L 12/40032* (2013.01); *H04L 47/2458* (2013.01); *H04L 47/56* (2013.01); *H04J 3/1617* (2013.01); *H04L 2012/5613* (2013.01)

(58) Field of Classification Search
CPC .................. H04J 3/0652; H04J 3/1617; H04L 2012/5613
USPC .................................................. 370/363, 440
See application file for complete search history.

(56) References Cited

U.S. PATENT DOCUMENTS

| 7,010,619 | B2 * | 3/2006 | Vowe ..................... H04L 12/40 340/5.31 |
| 7,206,882 | B2 * | 4/2007 | White, III ......... H04L 12/40013 710/110 |
| 7,307,994 | B2 * | 12/2007 | Kurita ........................ 370/395.3 |
| 7,428,608 | B2 * | 9/2008 | Yakashiro ..................... 710/116 |
| 8,662,882 | B2 * | 3/2014 | Wang ............................ 425/573 |
| 2003/0046417 | A1 * | 3/2003 | Ellis ............................. 709/232 |
| 2003/0070022 | A1 * | 4/2003 | Ito ............................... 710/240 |

OTHER PUBLICATIONS

K. Tindell, A. Burns, A. Wellings, "Analysis of Hard Real-Time Communications," Real-Time Systems Research Group (Journal), Department of Computer Science, University of York, England. Jun. 27, 1994 147-171 pages, vol. 9.

* cited by examiner

*Primary Examiner* — Ricky Ngo
*Assistant Examiner* — Dewanda Samuel
(74) *Attorney, Agent, or Firm* — Mentor Graphics Corporation

(57) ABSTRACT

This application discloses determining a worst-case latency in a controller area network (CAN) for messages experiencing priority inversion within individual controllers. A system to determine the worst-case latency can include a memory system to store computer-executable instructions and a computing system, in response to execution of the computer-executable instructions, can identify that a controller area network (CAN) design includes a controller configured to sequence messages for transmission over a shared bus with at least one of the messages experiencing priority inversion. The computing system also can determine a delay for the controller to present a first message to the shared bus for transmission when the first message is ordered behind a second message having a lower priority than the first message. The delay may be a portion of the worst-case latency corresponding to the priority inversion.

15 Claims, 9 Drawing Sheets

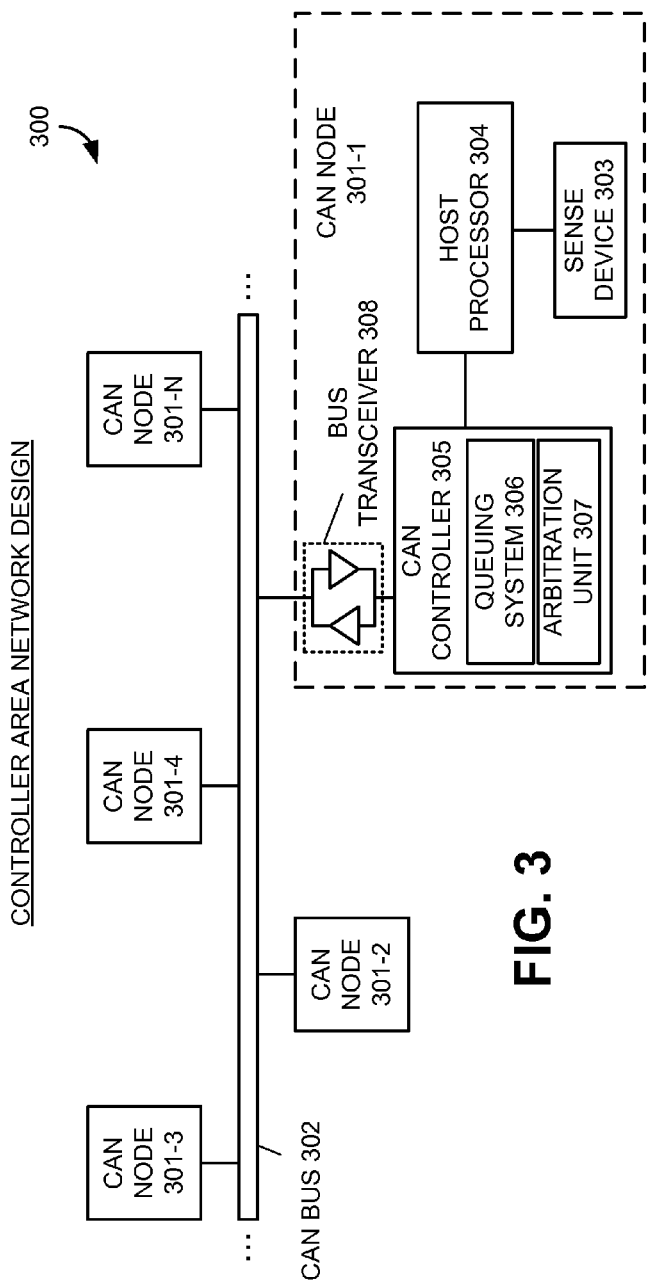
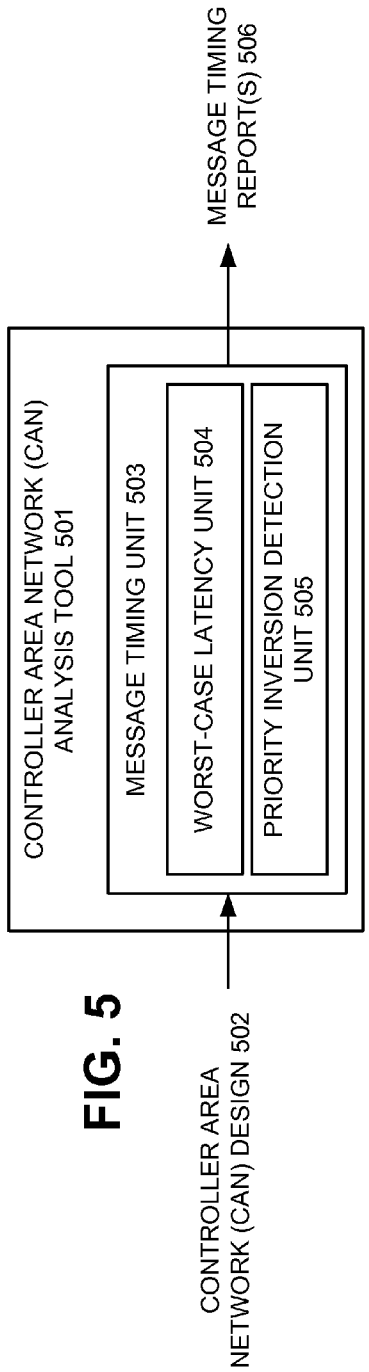
FIG. 3
FIG. 5

CONTROLLER AREA NETWORK BUS TIMING

CONTROLLER AREA NETWORK (CAN) WORST-CASE MESSAGE LATENCY WITH PRIORITY INVERSION

TECHNICAL FIELD

This application is generally related to a controller area network (CAN) and, more specifically, to determining worst-case latency for messages experiencing priority inversion in a controller area network design.

BACKGROUND

A controller area network (CAN) standard defines a message-based protocol that can be utilized to transmit and receive messages between multiple controllers over a shared bus. This technology is widely utilized in the automotive and aerospace industries to transmit messages through vehicles and airplanes, for example, communicating sensory input or device states between various controllers over the bus.

Controllers with messages to send can arbitrate utilization of the bus based on an identification field in the messages, as a value in the identification field can both identify the message and indicate a priority of the message. When controllers have messages to transmit on the bus, each of them can begin transmitting their corresponding message on the bus during a same transmission period and listen to the bus to determine whether the identification field of their message was overwritten by a message from a competing controller. If the identification field of their message was not overwritten, the controller has control over the bus and can continue to transmit the message. When the identification field of their message is overwritten, however, the controller loses bus arbitration to another controller with a dominant priority annunciated by the identification field in the message.

Each controller typically includes at least one queue or other storage buffer to order messages awaiting transmission over the bus. The controllers can order messages awaiting transmission with any number of schemes, for example, the ordering can be based on message priority in the identification field, arrival time at the controller, a transmission period, a retransmission interval defined for the message, a combination of thereof, or the like. Thus, a message awaiting transmission over the bus contends with competing messages locally in the controller as well as with messages in other controllers attempting to utilize the bus.

Since controller area networks typically include many controllers, each of which can relay messages from multiple sensors, actuators, and/or control devices, they are often designed, tested, and verified in software prior to implementation. After generation of a design for a controller area network, software and hardware "tools" can attempt to verify the design, for example, by confirming interconnections between components in the controller area network, determining timing latencies for different messages in the design, etc. The results of the verification process can be utilized to confirm the design operates within a specification, correct errors in the design, or otherwise improve the design.

One of the timing latency metrics that can be determined during the verification process is worst-case latency for a message, which can identify a longest time the message can take to be delivered through the controller area network. Traditionally, the software and hardware "tools" utilize deadline monotonic analysis (DMA) to determine the worst-case latency for a message. Deadline monotonic analysis, however, assumes that each controller provides messages to the bus in priority-order, i.e., without priority inversion within the controller itself. Since many types of controllers utilize ordering schemes that do not provide messages to the bus in priority-order, traditional "tools" often succumb to using probabilistic methods to predict the worst-case latency with a "good enough" confidence level. Understanding the limits to traditional worst-case latency analysis, many designers of controller area networks build their designs with a fair amount of cushioning in order to accommodate the lack of precision available in conventional calculations of the worst-case message latency, for example, by self-limiting bus load to a lower level than available or implementing redundant transmission of high-priority messages.

SUMMARY

This application discloses tools and mechanisms for determining worst-case latency for messages experiencing priority inversion in a controller area network design. According to various embodiments, the tools and mechanisms can identify that a controller area network design includes a controller configured to sequence messages for transmission over a shared bus with at least one of the messages experiencing priority inversion, and determine a delay for the controller to present a first message to the shared bus for transmission when the first message is ordered behind a second message having a lower priority than the first message. The delay may be a portion of the worst-case latency corresponding to the priority inversion.

DESCRIPTION OF THE DRAWINGS

FIG. 3 illustrates an example controller area network design according to various embodiments of the invention.

FIG. 5 illustrates an example of a controller area network simulation tool including a worst-case latency unit that may be implemented according to various embodiments of the invention.

DETAILED DESCRIPTION

Illustrative Operating Environment

The execution of various controller area network design processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some processes and the large size of many controller area network designs, various controller area network tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
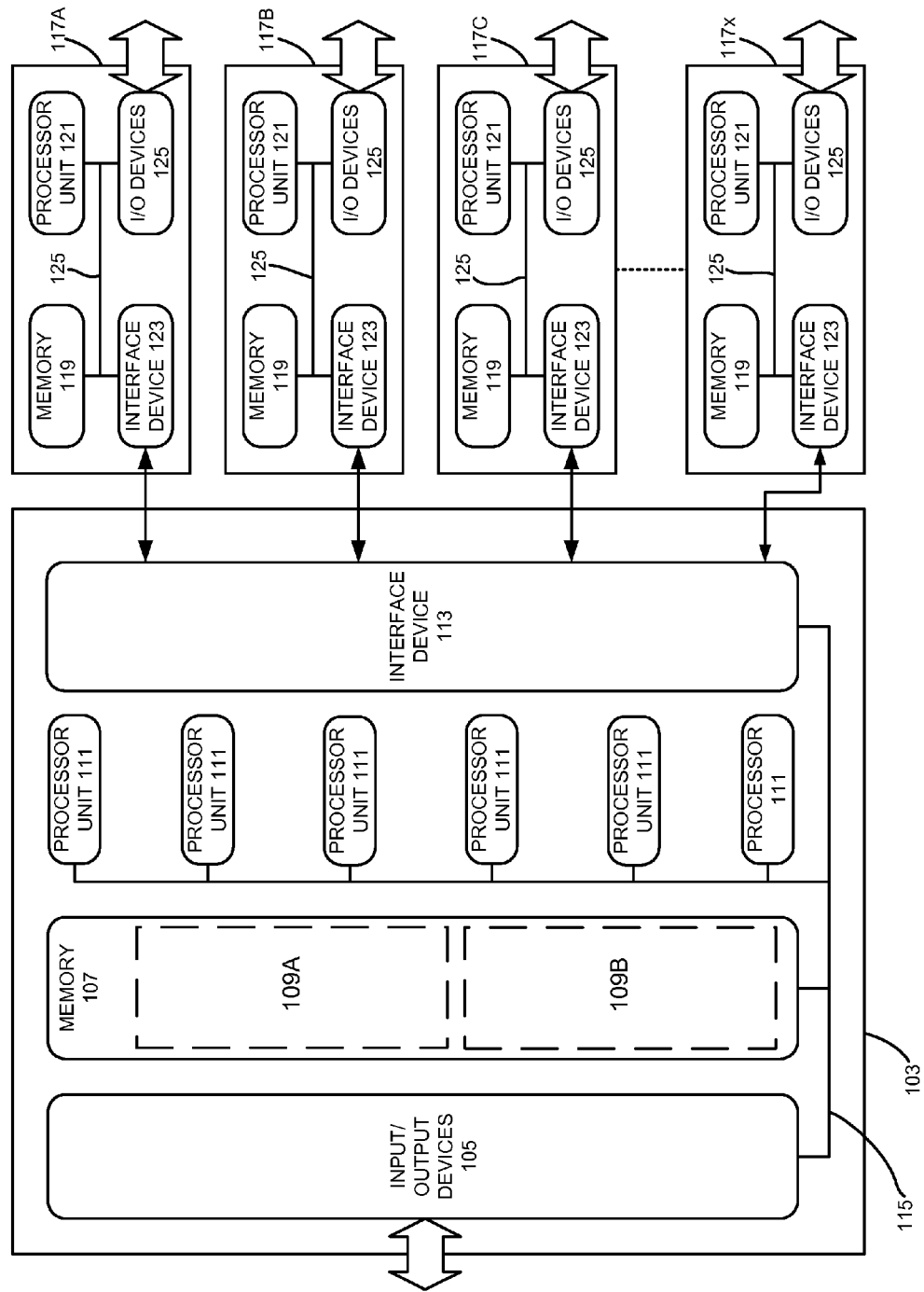
FIGS. 1 and 2 illustrate an example of a computer system of the type that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
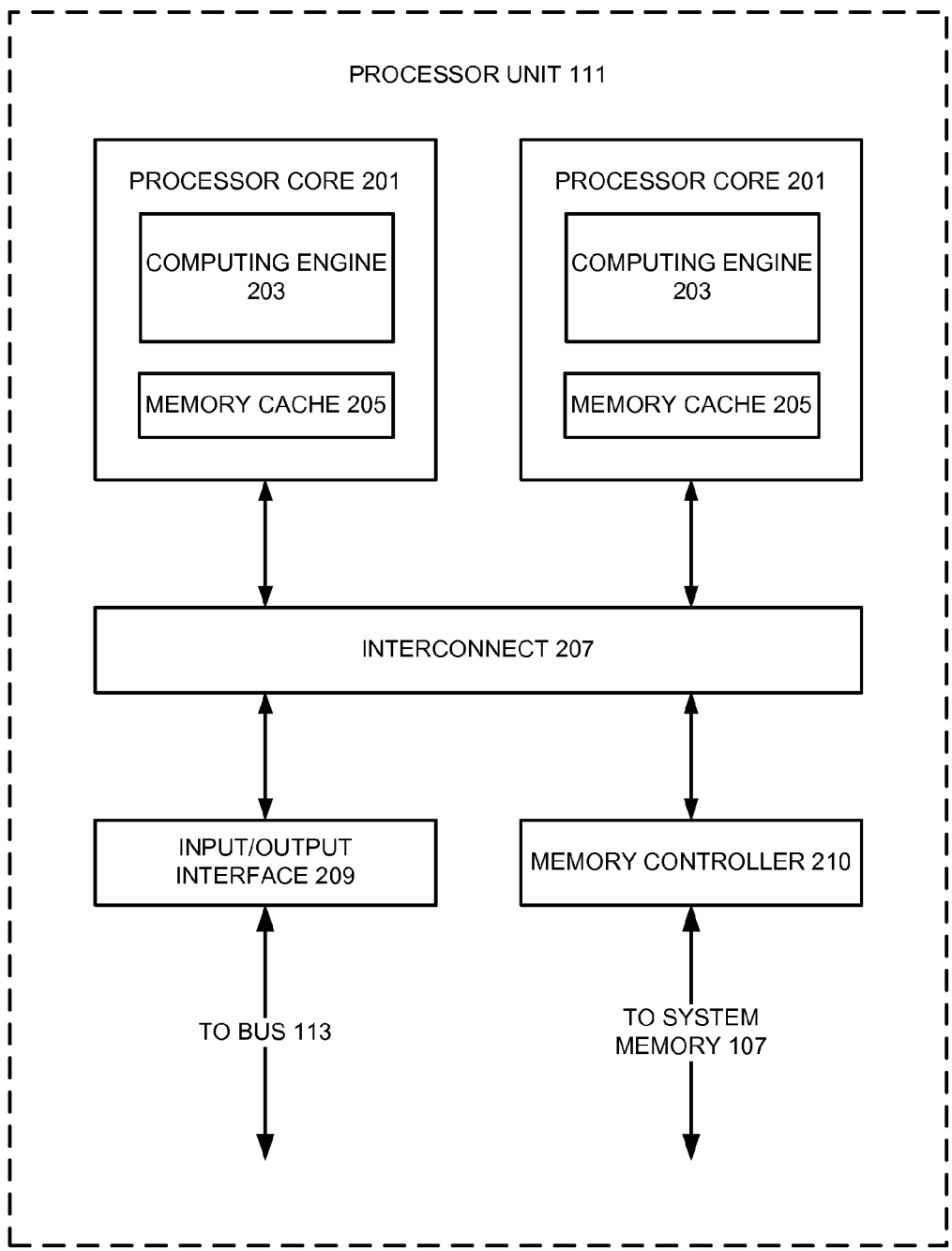

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Illustrative Controller Area Network (CAN) Design

FIG. 3 illustrates an example controller area network design 300 according to various embodiments of the invention. Referring to FIG. 3, a controller area network design 300 can model a controller area network, for example, coded as a netlist or coded in a hardware description language (HDL), such as Verilog, Very high speed integrated circuit Hardware Design Language (VHDL), or the like. The controller area network design 300 can include multiple CAN nodes 301-1 to 301-N coupled to exchange messages over a CAN bus 302 in a serial-fashion according to a message-based protocol, for example, as defined by a controller area network standard.

Since the CAN bus 302 is a shared system resource, the CAN nodes 301-1 to 301-N can arbitrate for access to the CAN bus 302 with their corresponding messages. In some embodiments, the messages can include identification fields, which can provide an identification of the message as well as indicate a priority of the message. For example, when the CAN node 301-1 has a message to transmit over the CAN bus 302, the CAN node 301-1 can begin transmitting the identification field of the message on the CAN bus 302 and listen to the CAN bus 302 to determine whether identification field in the message was overwritten, indicating another one of the CAN nodes 301-2 to 301-N transmitted a different message on the CAN bus 302 having a higher priority level. If the identification field of the message was not overwritten, the CAN node 301-1 has control over the CAN bus 302 and can continue to transmit the message. When the identification field of the message was overwritten, however, the CAN node 301-1 lost bus arbitration to the message having an identification field with the higher priority level.

The CAN node 301-1 can include a host processor 304 to generate messages for transmission over the CAN bus 302, for example, in response to input from a sense device 303. The sense device 303 can be a sensor, actuator, or other control device internal or external to the CAN node 301-1, which can generate the input for the CAN node 301-1 based on external conditions or activities. For example, the sense device 303 can be a sensor, such as a tire pressure sensor, temperature sensor, or any other type of sensor, which can generate input based on a sensed external condition. When the sense device 303 is a button, a switch, a multi-state device, or the like, the sense device 303 can generate input based on a current state or in response to a change of a state.

The CAN node 301-1 can include a CAN controller 305 to receive the messages generated by the host processor 304 and present the messages to the CAN bus 302 for transmission via a bus transceiver 308. The CAN controller 305 can receive messages from other CAN nodes 302-2 to 302-N over the CAN bus 302 via the bus transceiver 308, and forward the messages to the host processor 304 for processing.

The CAN controller 305 can include a queuing system 306 to order messages awaiting transmission over the CAN bus 302. The queuing system 306 can order these messages with any number of schemes, for example, the ordering can be based on message priority in an identification field, arrival time of the messages at the CAN controller 305, a combination of thereof, or the like. For example, the queuing system 306 in the CAN controller 305 can be implemented as one or more queues or buffers capable of ordering messages without priority inversion, or, as shown below with examples in FIGS. 4A and 4B, implemented as a queuing system that can allow message priority inversion, such as a First-In-First-Out (FIFO) buffer, a paired buffering system, or the like.

The CAN controller 305 can include an arbitration unit 307 to determine when the CAN node 301-1 gains access to the CAN bus 302 to transmit a particular message. For example, when transmitting the identification field of a message, the arbitration unit 307 can listen to the bus to identify whether the identification field of the message was overwritten on the CAN bus 302 and prompt the CAN controller 305 to continue or cease transmitting the message based on whether the identification field of the message was overwritten on the CAN bus 302. Each CAN node 301-2 to 301-N can include electrical components similar to those of the CAN node 301-1 shown in FIG. 3—the specific instances of those electrical components, however, can be implemented variously in the controller area network design 300.

Figure 4A:
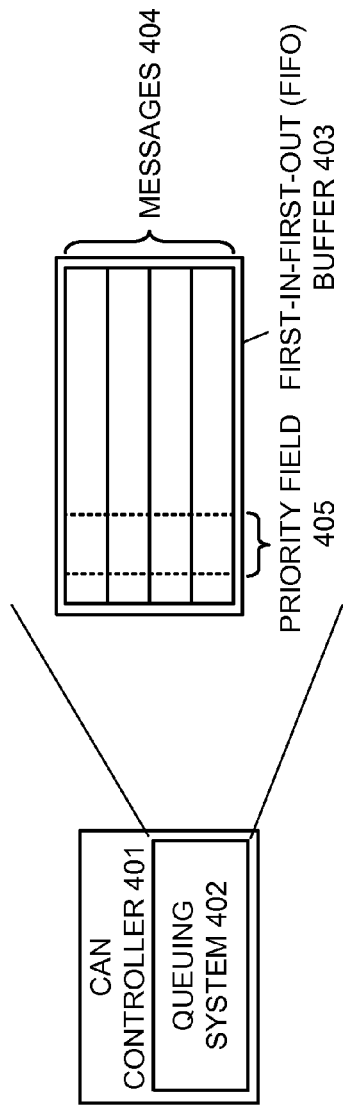
FIGS. 4A and 4B illustrate example embodiments for implementing a queuing system in the controller area network design shown in FIG. 3.
Figure 4B:
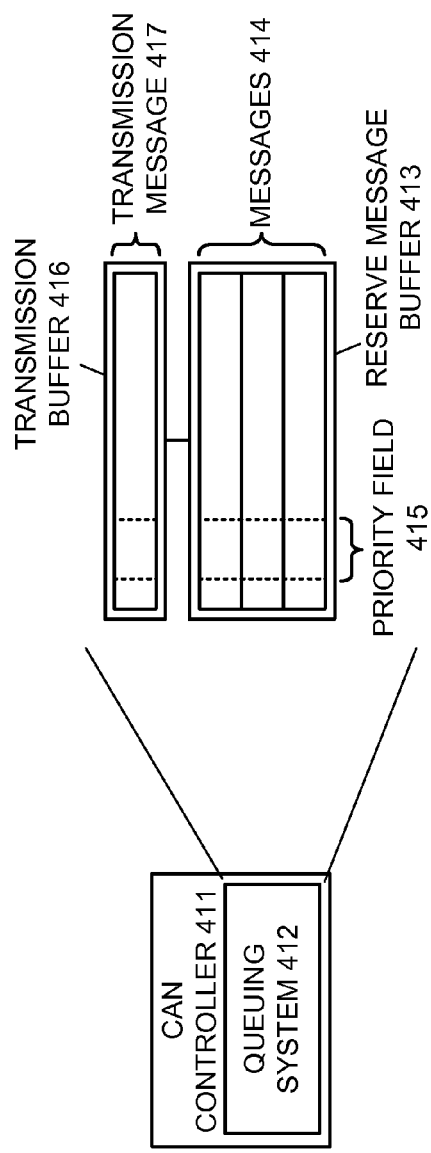

FIGS. 4A and 4B illustrate example embodiments for implementing a queuing system in a CAN controller of the controller area network design 300. Referring to FIG. 4A, a CAN controller 401 can include a queuing system 402 having a First-In-First-Out buffer 403 to order messages 404 awaiting transmission over the CAN bus 302 based on an arrival time of the messages 404 at the First-In-First-Out buffer 403. Each of the messages 404 can include a priority field 405, which can indicate a relative priority of the messages 404 in the controller area network design 300. Since the First-In-First-Out buffer 403 orders messages 404 awaiting transmission over the CAN bus 302 based on an arrival time of the messages 404, not based on a priority of the messages, the queuing system 402 can experience priority inversion.

Referring to FIG. 4B, a CAN controller 411 can include a queuing system 412 having a pair of buffers—a transmission buffer 416 and a reserve message buffer 413—to order messages 414 and 417 awaiting transmission over the CAN bus 302. Each of the messages 414 and 417 can include a priority field 415, which can indicate a relative priority of the messages 414 and 417 in the controller area network design 300.

The transmission buffer 416 can hold a transmission message 417, which the CAN controller 411 can present to (or initiate transmission of the identification field on) the CAN bus 302 during a next bus transmission period. The reserve message buffer 413 can hold other messages 414 awaiting transmission on the CAN bus 302. When the transmission buffer 416 has an opening to store a message, the CAN controller 411 can select a message, for example, having the highest priority, from the messages 414 stored in the reserve message buffer 413 to populate the opening in the transmission buffer 416. Since, in some instances, a high-priority new message may arrive at the reserve message buffer 413, while the transmission buffer 416 is populated with the transmission message 417 having a lower-priority than the high-priority new message, the queuing system 412 can experience priority inversion until the transmission message 417 having a lower-priority transmits over the CAN bus 302 freeing the transmission buffer 416 for population with one of the messages 414 from the reserve message buffer 413.

Worst-Case Message Latency Determination with Priority Inversion

FIG. 5 illustrates an example of a controller area network analysis tool 501 including a worst-case latency unit 506 that may be implemented according to various embodiments of the invention. Referring to FIG. 5, the controller area network analysis tool 501 can receive a controller area network design 502, which can describe components and operations of a controller area network. In some embodiments, the controller area network design 502 can be similar to the controller area network design 300 discussed above in FIGS. 3, 4A, and 4B.

The controller area network design 502 can include parameters of the controller area network, such as an identification of a number of CAN nodes in the controller area network design 502, an identification of a type of queuing system implemented by each CAN node, an identification of a location of the CAN node on the network, etc. The type of queuing system implemented by the CAN nodes can identify an internal ordering or queuing scheme implemented by an associated CAN controller in the CAN node, for example, which can indicate whether priority inversion of messages can occur in the CAN nodes. The controller area network design 502 can include parameters of the controller area network, such as an identification of messages available to be transmitted by each CAN node over the CAN bus in the controller area network design 502, for example, including information regarding the priority of the messages that can be sent from each CAN node, whether the messages are periodic or sporadically generated by the CAN node, or the like. The controller area network design 502 can include parameters of the controller area network, such as an identification of the operation of the CAN bus, i.e., a frame period, a frame transmission time, or the like.

The controller area network analysis tool 501 can analyze the controller area network modeled in the controller area network design 502, and include a message timing unit 503 to generate a message timing report 506 for the controller area network design 502. The message timing report 506 can identify timing metrics for messages transmitted over the CAN bus in the controller area network during simulation of the controller area network design 502.

The message timing unit 503 can include a worst-case latency unit 504 to determine a worst-case latency for delivery of one or more target messages through the controller area network during analysis of the controller area network design 502. The worst-case latency for a target message delivered through the controller area network can include several different delay time intervals including a generation delay, a queuing delay, a transmission delay, and a delivery delay. The generation delay can correspond to a time taken to generate of the target message, for example, between the detection of an event by a sense device until the target message is generated and provided to a CAN controller for transmission to a destination CAN node over the CAN bus. The queuing delay can correspond to a time taken for the target message to gain access to the shared bus, which can include both a time for the target message to elevate in the queuing system of the CAN controller to be presented to the CAN bus and a time an arbitration time before the target message gains access to the CAN bus. The transmission delay can correspond to a time taken for the target message to transmit on the shared bus to the destination CAN node. The delivery delay can correspond to a time taken for the destination CAN node to process the target message and deliver the target message to a destination endpoint device.

Previously, worst-case latency calculations included a queuing delay that assumed that CAN controllers ordered messages for presentation to the CAN bus based on priority, i.e., that the CAN controllers did not experience priority inversion. Since the controller area network design 502 can include CAN controllers having queuing schemes that experience priority inversion, thus increasing worst-case queuing delay for some target messages, the message timing unit 503 can include a priority inversion detection unit 505 to determine whether each CAN controller in the controller area network design 502 can include messages that experience priority inversion, for example, based on the type of queuing system utilized by the CAN controllers.

The worst-case latency unit 504 can utilize the determination from the priority inversion detection unit 505 to ascertain a worst-case latency for one or more target messages with consideration of the possibility for priority inversion in the CAN controllers. For example, the worst-case latency unit 504 can identify a worst-case situation or scenario that includes having a target message blocked from being presented to the CAN bus by the most messages possible given the queuing system of a CAN controller, which can include one or more lower priority messages. Example embodiments for the queuing delay in worst-case message latency determination with priority inversion will be described below in greater detail.

Figure 6A:
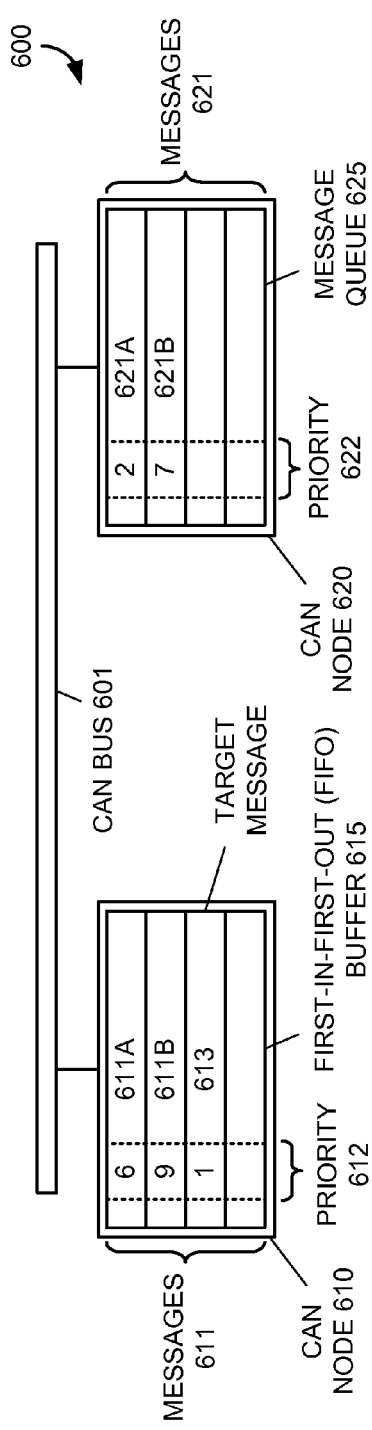
FIGS. 6A and 6B illustrate an example worst-case latency determination for messages in a controller area network design according to various embodiments of the invention.
Figure 6B:
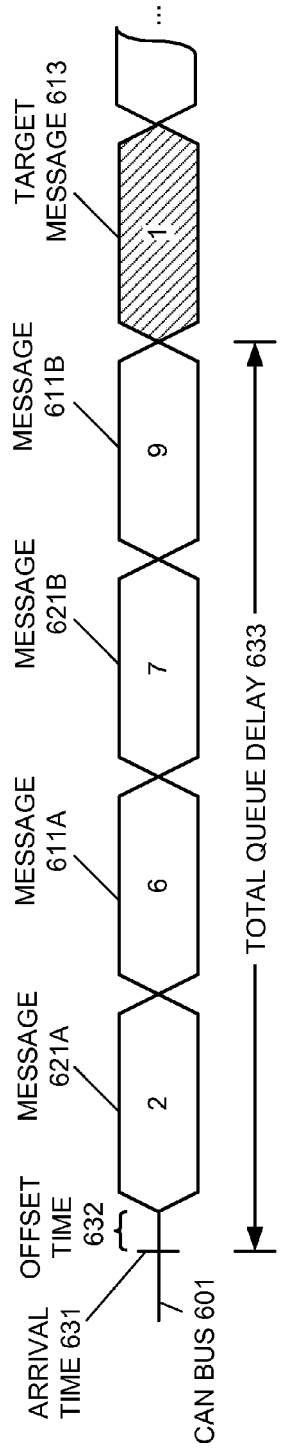

FIGS. 6A and 6B illustrate an example worst-case latency determination for messages in a controller area network design 600 according to various embodiments of the invention. Referring to FIGS. 6A and 6B, the controller area network design 600 can include a pair of CAN nodes 610 and 620 to exchange messages 611 and 621 with each other over a CAN bus 601. The CAN node 610 can include a queuing system comprising a First-In-First-Out (FIFO) buffer 615, which can order messages 611 based on when they were received by the CAN node 610. Each message 611 can include a priority 612, for example, a value in the identification field of the messages 611, which can indicate a relative priority of the messages 611 in the controller area network design 600. For a worst-case latency determination, the FIFO buffer 615 can be populated with the messages 611 in a worst-case order for a target message 613, i.e., with lower-priority messages 611A and 611B ordered ahead of the target message 613.

The CAN node 620 can include a message queue 625 to order messages 621 for transmission on the CAN bus 601. Each message 621 can include a priority 622, for example, a value in the identification field of the messages 621, which can indicate a relative priority of the messages 621 in the controller area network design 600. For the worst-case latency determination, the message queue 725 can be populated with the messages 621 in a worst-case order for the target message 613, i.e., with lower-priority messages 621A and 621B ordered to gain access to the CAN bus 601 before the target message 613.

During analysis of this example controller area network design 600, the worst-case latency unit 504 can populate the CAN nodes 610 and 620 with messages 611 and 621 in the worst-case order for the target message 613 and determine a total queue delay 633 between an arrival time 631 of the target message 613, for example, when the FIFO buffer 615 receives the target message 613 or when the target message 613 was generated by the CAN node 610, and a time when the CAN node 610 gains access to the CAN bus 601 to transmit the target message 613. This total queue delay 633 can include an offset time 632 between when the arrival time 631 of the target message 613 and a start of a next available transmission period on the CAN bus 601, as well as time taken by transmitting other messages 611 and 621 on the CAN bus 601 before the target message 613.

In this example, the CAN nodes 610 and 620, based on the worst-case order of the messages, arbitrate for the CAN bus 601 with messages 611A and 621A, respectively. Since message 621A has a priority of "2" and the message 611A has priority of "6", the CAN node 620 wins access to CAN bus 601 to transmit message 621A, while the CAN node 610 loses access to CAN bus 601 and waits to arbitrate for access to the CAN bus 601 for message 611A until the next available transmission period on the CAN bus 601.

After the message 621A transmits over the CAN bus 601, the CAN nodes 610 and 620 arbitrate for the CAN bus 601 with messages 611A and 621B, respectively. Since message 611A has a priority of "6" and the message 621B has priority of "7", the CAN node 610 wins access to CAN bus 601 to transmit message 611A, while the CAN node 620 loses access to CAN bus 601 and waits to arbitrate for access to the CAN bus 601 for message 621B until the next available transmission period on the CAN bus 601.

After the message 611A transmits over the CAN bus 601, the CAN nodes 610 and 620 arbitrate for the CAN bus 601 with messages 611B and 621B, respectively. Since message 621B has a priority of "7" and the message 611B has priority of "9", the CAN node 620 wins access to CAN bus 601 to transmit message 621B, while the CAN node 610 loses access to CAN bus 601 and waits to arbitrate for access to the CAN bus 601 for message 611B until the next available transmission period on the CAN bus 601.

After the message 621B transmits over the CAN bus 601, the CAN node 610 arbitrates for the CAN bus 601. Since CAN node 620 does not have any messages awaiting transmission on the CAN bus 601, the CAN node 610 wins access to CAN bus 601 to transmit message 611B.

After the message 611B transmits over the CAN bus 601, the CAN node 610 arbitrates for the CAN bus 601. Since CAN node 620 does not have any messages awaiting transmission on the CAN bus 601, the CAN node 610 again wins access to CAN bus 601 to transmit the target message 613.

If CAN node 610 had the ability to order its messages 611 by priority, the target message 613 having a priority of "1" would have allowed the CAN node 610 to win access to CAN bus 601 over the CAN node 620 during the first bus arbitration and transmit the target message 613 over the CAN bus 601. The total queue delay 633 for the target message 613, therefore, would correspond to the offset time 632. However, since the CAN node 601 implements a queuing scheme that allows for priority inversion, the target message 613 was blocked from being transmitted over the CAN bus 601 until messages 621A, 611A, 621B, and 611B were transmitted over the CAN bus 601. The total queue delay 633 for the target message 613 includes the offset time 632 and the time to transmit the messages 621A, 611A, 621B, and 611B.

Figure 7A:
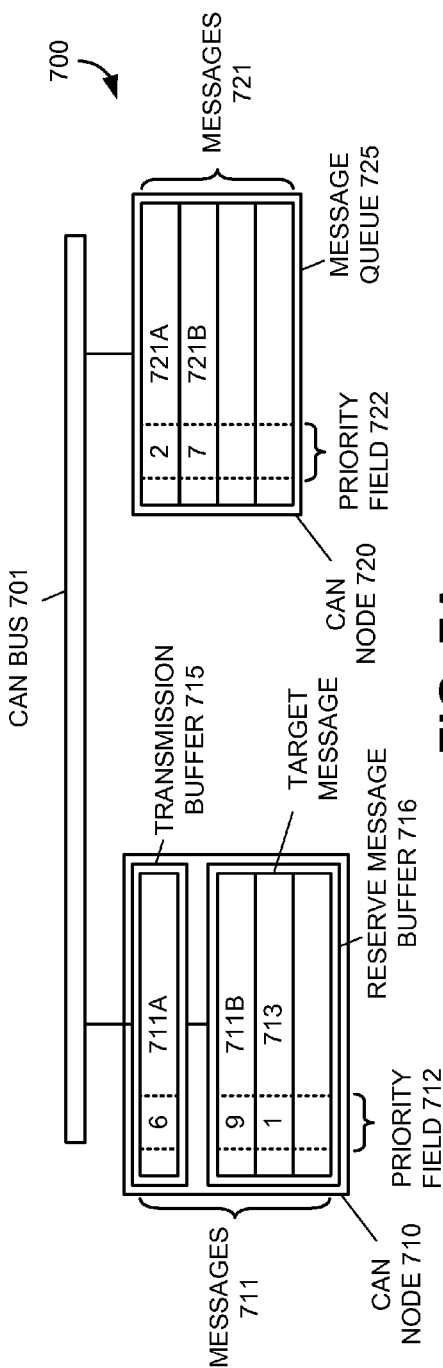
FIGS. 7A and 7B illustrate another example worst-case latency determination for messages in a controller area network design according to various embodiments of the invention.
Figure 7B:
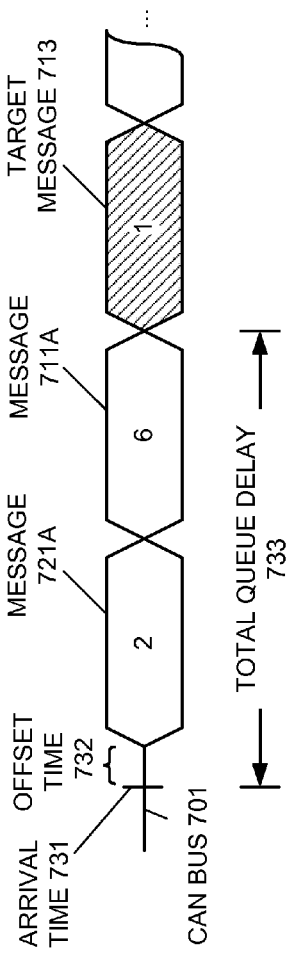

FIGS. 7A and 7B illustrate another example worst-case latency determination for messages in a controller area network design 700 according to various embodiments of the invention. Referring to FIGS. 7A and 7B, the controller area network design 700 can include a pair of CAN nodes 710 and 720 to exchange messages 711 and 721 with each other over a CAN bus 701. Each message 711 can include a priority 712 and each message 721 can include a priority 722, for example, a value in the identification field of the messages 711 or 721, which can indicate a relative priority of the messages 711 and 721 in the controller area network design 700.

The CAN node 710 can include a queuing system comprising a transmission buffer 715 and a reserve message buffer 716. The transmission buffer 715 can hold a message, which the CAN node 710 can present to (or initiate transmission of the identification field on) the CAN bus 701 during a next available bus transmission period. The reserve message buffer 716 can hold additional messages 711 awaiting transmission on the CAN bus 701. When the transmission buffer 715 has an opening to store a message, the CAN node 710 can select a message having the highest priority from the reserve message buffer 716 to populate the opening in the transmission buffer 715. For a worst-case latency determination, the transmission buffer 715 and the reserve message buffer 716 can be populated with the messages 711 in a worst-case order for a target message 713, i.e., with lower-priority messages 711A populated in the transmission buffer 715.

The CAN node 720 can include a message queue 725 to order messages 721 for transmission on the CAN bus 701. For the worst-case latency determination, the message queue 725 can be populated with the messages 721 in a worst-case order for the target message 713, i.e., with lower-priority messages 721A and 721B ordered in an attempt to gain access to the CAN bus 701 before the target message 713.

During simulation of this example controller area network design 700, the worst-case latency unit 504 can populate the CAN nodes 710 and 720 with messages 711 and 721 in the worst-case order for the target message 713 and determine a total queue delay 733 between an arrival time 731 of the target message 713, for example, when the reserve message buffer 716 receives the target message 713 or when the target message 713 was generated by the CAN node 710, and a time when the CAN node 710 gains access to the CAN bus 701 to transmit the target message 713. This total queue delay 733 can include an offset time 732 between when the arrival time 731 of the target message 713 and a start of a next available transmission period on the CAN bus 701, as well as time taken by transmitting other messages 711 and 721 on the CAN bus 701 before the target message 713.

In this example, the CAN nodes 710 and 720, based on the worst-case order of the messages, arbitrate for the CAN bus 701 with messages 711A and 721A, respectively. Since message 721A has a priority of "2" and the message 711A has priority of "6", the CAN node 720 wins access to CAN bus 701 to transmit message 721A, while the CAN node 710 loses access to CAN bus 701 and waits to arbitrate for access to the CAN bus 701 for message 711A until the next available transmission period on the CAN bus 701.

After the message 721A transmits over the CAN bus 701, the CAN nodes 710 and 720 arbitrate for the CAN bus 701 with messages 711A and 721B, respectively. Since message 711A has a priority of "6" and the message 721B has priority of "7", the CAN node 710 wins access to CAN bus 701 to transmit message 711A, while the CAN node 720 loses access to CAN bus 701 and waits to arbitrate for access to the CAN bus 701 for message 721B until the next available transmission period on the CAN bus 701.

After the message 711A transmits over the CAN bus 701, the CAN node 710 can selection one of the messages 711 in the reserve message buffer 716 for population into the transmission buffer 715. In some embodiments, the CAN node 710 can select the target message 713 for population based on the priority of the target message 713 relative to the other message 711B in the reserve message buffer 716.

The CAN nodes 710 and 720 arbitrate for the CAN bus 701 with target message 713 and message 721B, respectively. Since the target message 713 has a priority of "1" and the message 721B has priority of "7", the CAN node 710 wins access to CAN bus 701 to transmit the target message 713, while the CAN node 720 loses access to CAN bus 701 and waits to arbitrate for access to the CAN bus 701 for message 721B until the next available transmission period on the CAN bus 701. The total queue delay 733 for the target message 713 corresponds to the offset time 732 plus the transmission times for messages 721A and 711A caused by the priority inversion in the CAN node 710.

Figure 8A:
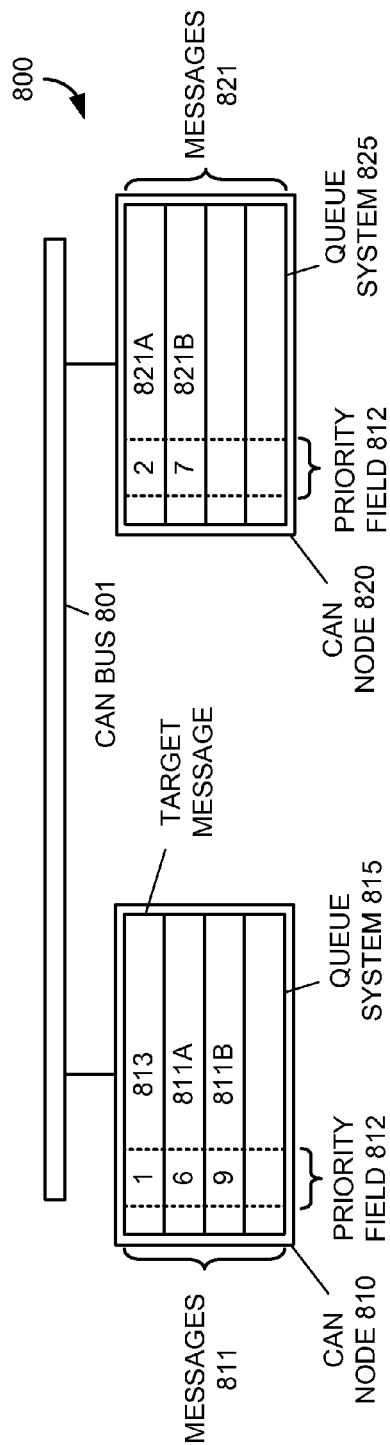
FIGS. 8A and 8B illustrate yet another example worst-case latency determination for messages in a controller area network design according to various embodiments of the invention.
Figure 8B:
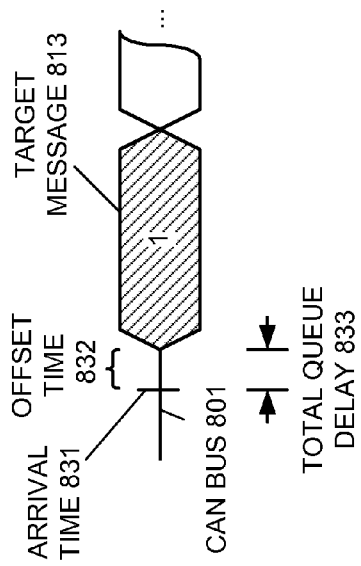

FIGS. 8A and 8B illustrate yet another example worst-case latency determination for messages in a controller area network design 800 according to various embodiments of the invention. Referring to FIGS. 8A and 8B, the controller area network design 800 can include a pair of CAN nodes 810 and 820 to exchange messages 811 and 821 with each other over a CAN bus 801. Each message 811 can include a priority 812 and each message 821 can include a priority 822, for example, a value in the identification field of the messages 811 or 821, which can indicate a relative priority of the messages 811 and 821 in the controller area network design 800.

The CAN node 810 can include a queuing system 815 to order messages 811 based on the priority 812 of the messages 811. For the worst-case latency determination, the queuing system 815 can be populated with the messages 811 in a worst-case order for the target message 813. The CAN node 820 can include a queuing system 825 to order messages 821 for transmission on the CAN bus 801. For the worst-case latency determination, the queuing system 825 can be populated with the messages 821 in a worst-case order for the target message 813, i.e., with lower-priority messages 821A and 821B ordered in an attempt to gain access to the CAN bus 801 before the target message 813.

During analysis of this example controller area network design 800, the worst-case latency unit 504 can populate the CAN nodes 810 and 820 with messages 811 and 821 in the worst-case order for the target message 813 and determine a total queue delay 833 between an arrival time 831 of the target message 813, for example, when the queuing system 815 receives the target message 813 or when the target message 813 was generated by the CAN node 810, and a time when the CAN node 810 gains access to the CAN bus 801 to transmit the target message 813. This total queue delay 833 can include an offset time 832 between when the arrival time 831 of the target message 813 and a start of a next available transmission period on the CAN bus 801, as well as time any taken by transmitting other messages 811 and 821 on the CAN bus 801 before the target message 813.

In this example, the CAN nodes 810 and 820, based on the worst-case order of the messages, arbitrate for the CAN bus 801 with the target message 813 and message 821A, respectively. Since the target message 813 has a priority of "1" and the message 821A has priority of "2", the CAN node 810 wins access to CAN bus 801 to transmit the target message 813, while the CAN node 820 loses access to CAN bus 801 and waits to arbitrate for access to the CAN bus 801 for message 821A until the next available transmission period on the CAN bus 801. The total queue delay 833 for the target message 813 corresponds to the offset time 832.

Figure 9A:
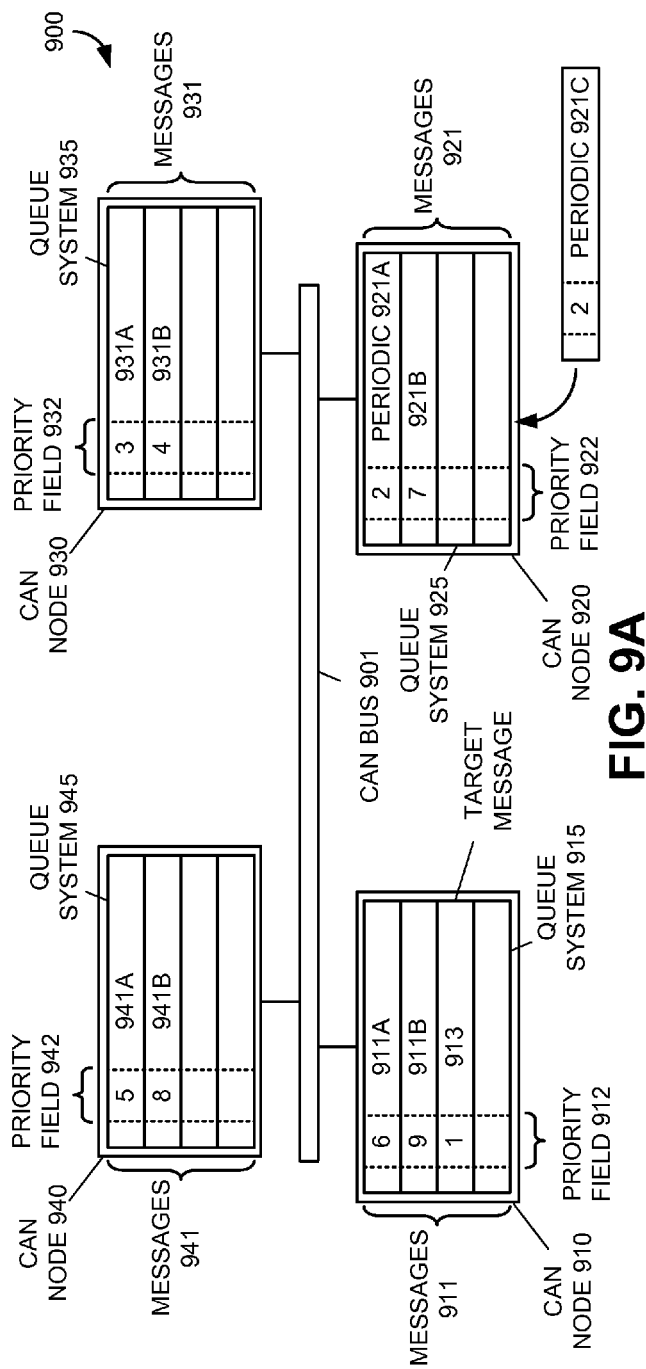
FIGS. 9A and 9B illustrate yet another example worst-case latency determination for messages in a controller area network design according to various embodiments of the invention.
Figure 9B:
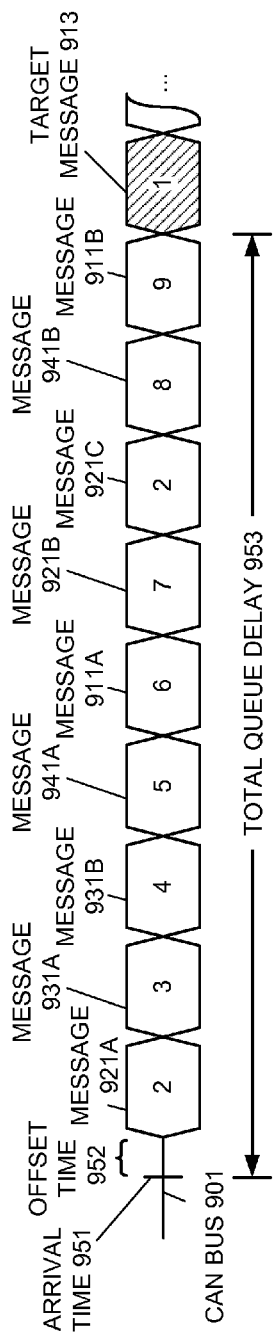

FIGS. 9A and 9B illustrate yet another example worst-case latency determination for messages in a controller area network design 900 according to various embodiments of the invention. Referring to FIGS. 9A and 9B, the controller area network design 900 can include multiple CAN nodes 910-940 to exchange messages 911-941, respectively, with each other over a CAN bus 901. Each message 911-941 can include a priority 912, for example, a value in the identification field of the messages 911-941, which can indicate a relative priority of the messages 911-941 in the controller area network design 900.

The CAN nodes 910 can each include a queue system 915-945, which can order messages 911 for transmission over the CAN bus 901. In some embodiments, the queue system 915 can order messages in such a way as to allow priority inversion, i.e., allowing lower priority messages 911 in the queue system 915 to be transmitted over the CAN bus 901 before higher priority messages 911 in the queue system 915.

For a worst-case latency determination, the queue system 915 can be populated with the messages 911 in a worst-case order for a target message 913, i.e., with lower-priority messages 911A and 911B ordered ahead of the target message 913. During simulation of this example controller area network design 900, the worst-case latency unit 504 can populate the CAN nodes 910-940 with messages 911-941 in the worst-case order for the target message 913 and determine a total queue delay 933 between an arrival time 931 of the target message 913, for example, when the queue system 915 receives the target message 913 or when the target message 913 was generated by the CAN node 910, and a time when the CAN node 910 gains access to the CAN bus 901 to transmit the target message 913. This total queue delay 933 can include an offset time 932 between when the arrival time 931 of the target message 913 and a start of a next available transmission period on the CAN bus 901, as well as time taken by transmitting other messages 911 and 921 on the CAN bus 901 before the target message 913.

In this example, the CAN nodes 910-940 sequentially arbitrate for the CAN bus 901 with messages 911-941 similar to as discussed above in FIGS. 6A-6B, 7A-7B, and 8A-8B, with the following differences. The CAN node 920 can store two different types of messages for transmission over the CAN bus 901—periodic messages 921A and 921C and a sporadically-generated message 921B. In some worst-case scenarios, a periodicity of some messages can be short enough to allow for multiple instances of those periodic messages to be transmitted prior to the transmission of a target message. For example, a frequency of the periodic messages 921A and 921C can be sufficiently high to allow a periodic message 921C—arriving in the queue system 925 after the target message 913 arrives in the queue system 915—to be transmitted over the CAN bus 901 before the target message 913. In this example, the periodic message 921C can arrive the queue system 925 after the initial arbitration on the CAN bus 901, but before the transmission of the message 941B. The total queue delay 933 for the target message 913 includes the offset time 932 and the time to transmit the messages 911A-911B, 921A-921C, 931A-931B, and 941A-941B over the CAN bus 901.

Figure 10:
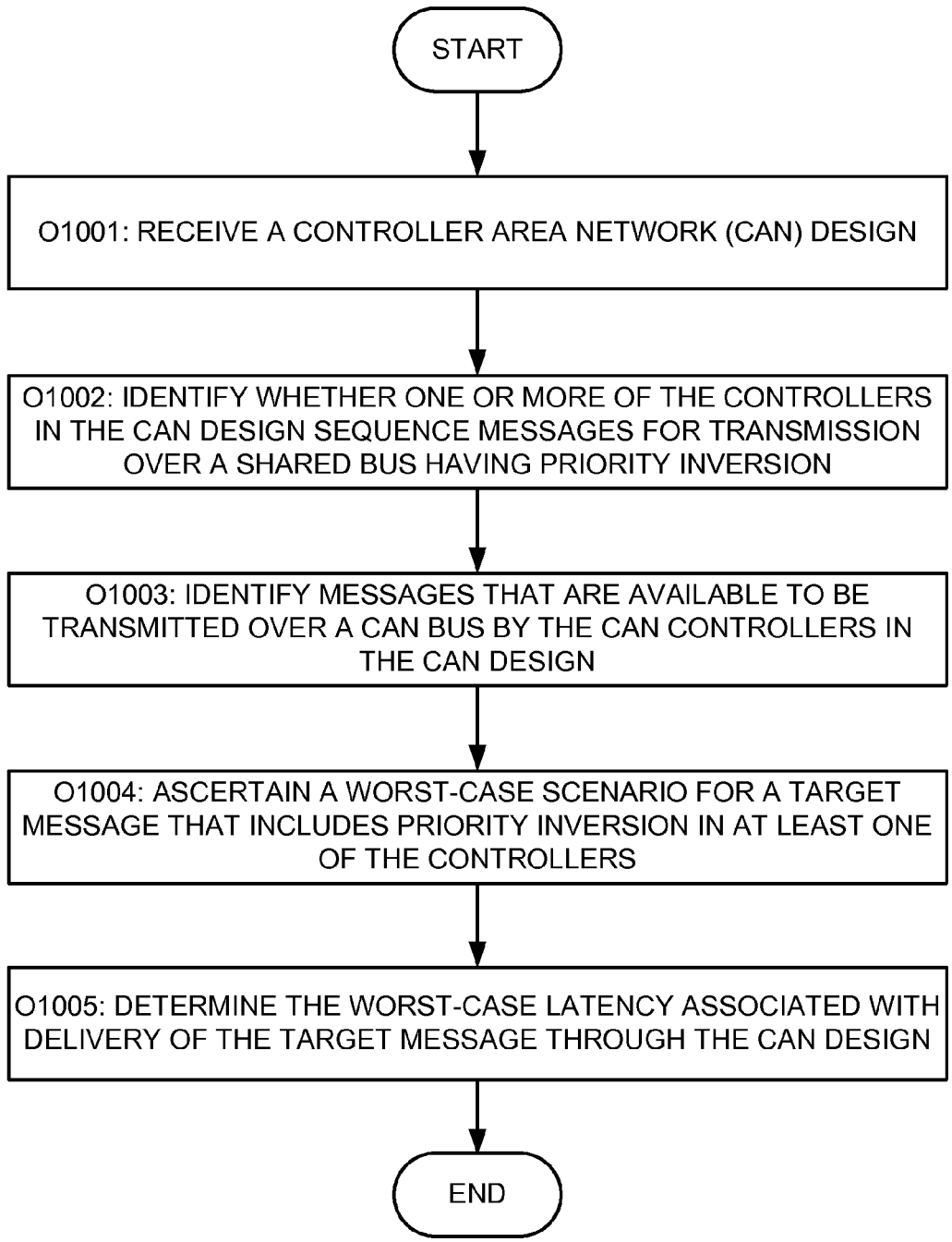
FIG. 10 illustrates a flowchart showing a worst-case latency determination for messages in a controller area network design according to various examples of the invention.

FIG. 10 illustrates a flowchart showing a worst-case latency determination for messages in a controller area network design according to various examples of the invention. Referring to FIG. 10, in a block 1001, a controller area network (CAN) simulation tool can receive a CAN design, which can describe components and operations of a controller area network. In some embodiments, the CAN design can be similar to the controller area network design 300 discussed above in FIGS. 3, 4A, and 4B.

The CAN design can include parameters of the controller area network, such as an identification of messages available to be transmitted by each CAN node over the CAN bus in the CAN design, for example, including information regarding the priority of the messages that can be sent from each CAN node, whether the messages are periodic or sporadically generated by the CAN node, or the like. The CAN design can include parameters of the controller area network, such as an identification of the operation of the CAN bus, i.e., a frame period, a frame transmission time, or the like.

In a block 1002, the CAN simulation tool can identify whether one or more of the controllers in the CAN design sequence messages for transmission over a shared bus with at least one of the messages experiencing priority inversion. The CAN design can include parameters of the controller area network, such as an identification of a number of CAN nodes in the CAN design, an identification of a type of queuing system implemented by each CAN node, an identification of a location of the CAN node on the network, etc. The type of queuing system implemented by the CAN nodes can identify an internal ordering or queuing scheme implemented by an associated CAN controller in the CAN node, for example, which can indicate whether priority inversion of messages can occur in the CAN nodes. From these parameters, the CAN simulation tool can determine which controllers can experience message priority inversion and the severity of the inversion.

In a block 1003, the CAN analysis tool can identify messages that are available to be transmitted over a CAN bus by the CAN controllers in the CAN design. The parameters of the controller area network can include an identification of messages available to be transmitted by each CAN node over the CAN bus in the CAN design, for example, including information regarding the priority of the messages that can be sent from each CAN node, whether the messages are periodic or sporadically generated by the CAN node, or the like. The parameters of the controller area network also can include an identification of the operation of the CAN bus, i.e., a frame period, a frame transmission time, or the like.

In a block 1004, the CAN analysis tool can ascertain a worst-case latency scenario for a target message that includes priority inversion in at least one of the controllers. The worst-case latency scenario can order all messages capable of being transmitted by the controller ahead of the target message, and order messages in other controllers coupled to the CAN bus to maximize the delay for the target message in being transmitted over the CAN bus.

In a block 1005, the CAN analysis tool can determine the worst-case latency associated with delivery of the target message through the CAN design. The worst-case latency for the target message delivered through the controller area network can include several different delay time intervals including a generation delay, a queuing delay, a transmission delay, and a delivery delay. The generation delay can correspond to a time taken to generate of the message, for example, between the detection of an event by a sense device until the message is generated and provided to a controller for transmission to a destination CAN node over the CAN bus. The queuing delay can correspond to a time taken for the target message to gain access to the shared bus, which can include both a time for the target message to elevate in the queuing system of the controller to be presented to the CAN bus and a time an arbitration time before the message gains access to the CAN bus. The transmission delay can correspond to a time taken for the target message to transmit on the shared bus to the destination CAN node. The delivery delay can correspond to a time taken for the destination CAN node to process the target message and deliver the target message to a destination endpoint device.

The CAN simulation tool can calculate these various delays based on the worst-case scenario and determine the worst-case latency for the target message from the various delays. In some embodiments, the CAN simulation tool can generate a message timing report for the CAN design. The message timing report can identify timing metrics including the worst-case message latency during simulation of the CAN design.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to controller area network design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
receiving, by a computing device, parameters associated with a controller area network (CAN) having multiple controllers configured to transmit messages over a shared bus based, at least in part, on priorities associated with the messages, wherein the parameters are configured to identify that at least one of the controllers is configured to internally order a subset of the messages for presentation to the shared bus with priority inversion, and wherein the parameters identify each message available to be delivered over the shared bus, a frame period on the shared bus, a transmission time of a frame on the shared bus, and an offset between an initiation of message delivery and a start of the frame period; and
determining, by the computing device, a delay in delivery of a target message through the controller area network caused by the priority inversion based, at least in part, on the parameters.

2. The method of claim 1, further comprising determining, by the computing device, a worst-case latency associated with the delivery of the target message through the controller area network based, at least in part, on the parameters, wherein the worst-case latency includes the delay in the delivery of the target message through the controller area network caused by the priority inversion.

3. The method of claim 2, wherein determining the worst-case latency further comprising:
determining, by the computing device, a first time interval corresponding to a time taken to generate of the target message;

determining, by the computing device, a second time interval corresponding to a time taken for the target message to gain access to the shared bus;

determining, by the computing device, a third time interval corresponding to a time taken for the target message to transmit on the shared bus to a destination controller; and determining, by the computing device, a fourth time interval corresponding to a time taken to process the target message and deliver the target message to a destination endpoint device.

4. The method of claim 3, wherein determining the second time interval further comprising:

determining, by the computing device, a first elapsed time period spanning from generation of the target message to initial presentation of the target message to the shared bus, wherein the first elapsed time period includes the delay caused by the priority inversion during delivery of the target message through the controller area network; and determining, by the computing device, a second elapsed time period associated with arbitration of the target message on the shared bus.

5. The method of claim 1, wherein the priority inversion occurs when the target message is ordered behind one or more messages having lower priorities than the target message.

6. The method of claim 1, wherein the parameters are configured to indicate internal ordering schemes that are implemented by the controllers, and wherein one or more of the internally ordering schemes allow for priority inversion.

7. A system comprising:

a memory system configured to store computer-executable instructions; and a computing system, in response to execution of the computer-executable instructions, is configured to identify that a controller area network (CAN) design includes a controller configured to sequence messages for transmission over a shared bus, and to determine a worst-case latency associated with a delivery of a first message over the shared bus in the controller area network design, wherein the worst-case latency includes a first time to generate of the first message, a second time for the first message to gain access to the shared bus, which includes a delay for the controller to present the first message to the shared bus for transmission when the first message is ordered behind a second message having a lower priority than the first message, a third time for the first message to transmit over the shared bus, and a fourth time to deliver the first message from the shared bus to a destination endpoint device.

8. The system of claim 7, wherein the second time for the first message to gain access to the shared bus includes a first period defined between generation of the first message to initial presentation of the first message to the shared bus, and a second period associated with arbitration of the first message on the shared bus, wherein the first period includes the delay for the controller to present the first message to the shared bus for transmission.

9. The system of claim 7, wherein the computing system, in response to execution of the computer-executable instructions, is further configured to identify that the controller area network design includes the controller by reviewing parameters associated with the controller area network design, which indicate one or more controllers in the controller area network design are capable of sequencing messages with at least one of the messages experiencing priority inversion for transmission over the shared bus.

10. The system of claim 9, wherein the parameters identify a controller type for each controller in the controller area network.

11. The system of claim 9, wherein the parameters identify each message available to be delivered over the shared bus, a frame period on the shared bus, a transmission time of a frame on the shared bus, and an offset between an initiation of message delivery and a start of the frame period.

12. An apparatus comprising at least one computer-readable memory device storing instructions configured to cause one or more processing devices to perform operations comprising:

identifying a controller area network (CAN) design includes a controller configured to sequence messages for transmission over a shared bus; and determining a worst-case latency associated with a delivery of the first message over the shared bus in the controller area network design, wherein the worst-case latency includes a first time to generate of the first message, a second time for the first message to gain access to the shared bus, which includes a delay for the controller to present the first message to the shared bus for transmission when the first message is ordered behind a second message having a lower priority than the first message, a third time for the first message to transmit over the shared bus, and a fourth time to deliver the first message from the shared bus to a destination endpoint device.

13. The apparatus of claim 12, wherein determining the worst-case latency for the second time interval further comprising:

determining a first elapsed time period spanning from generation of the first message to initial presentation of the first message to the shared bus, wherein the first elapsed time period includes the delay for the controller to present the first message to the shared bus for transmission; and determining a second elapsed time period associated with arbitration of the first message on the shared bus.

14. The apparatus of claim 12, wherein identifying that the controller area network design includes the controller further comprising reviewing parameters associated with the controller area network design, which indicate one or more controllers in the controller area network design are capable of sequencing messages with at least one of the messages experiencing priority inversion for transmission over the shared bus.

15. The apparatus of claim 14, wherein the parameters identify each message available to be delivered over the shared bus, a frame period on the shared bus, a transmission time of a frame on the shared bus, and an offset between an initiation of message delivery and a start of the frame period.

* * * * *